(12) United States Patent  
Frederick, Jr. et al.

(10) Patent No.: US 7,407,593 B2
(45) Date of Patent: Aug. 5, 2008

(54) DEODORIZATION OF LIVESTOCK WASTE USING OZONE

(76) Inventors: William McDowell Frederick, Jr., 519 E. High Point Rd., Peoria, IL (US) 61614; Danny Paul Davis, 1671 Cr, 1800 E., Roanoke, IL (US) 61561

( * ) Notice: Subject to any disclaimer, the term of this patent is extended or adjusted under 35 U.S.C. 154(b) by 199 days.

(21) Appl. No.: 11/230,967

(22) Filed: Sep. 20, 2005

(65) Prior Publication Data

US 2007/0062883 A1  Mar. 22, 2007

(51) Int. Cl.
*C02F 1/00* (2006.01)
(52) U.S. Cl. .................. 210/760; 210/748; 250/436
(58) Field of Classification Search ............ 210/760, 210/748; 250/436
See application file for complete search history.

(56) References Cited

U.S. PATENT DOCUMENTS

| | | | |
|---|---|---|---|
| 4,155,975 A | 5/1979 | Riley | |
| 4,160,656 A | 7/1979 | Junkermann | |
| 4,386,580 A | 6/1983 | Johnson | |
| 4,465,019 A | 8/1984 | Johnson | |
| 4,655,933 A | 4/1987 | Johnson et al. | |
| 5,185,087 A | 2/1993 | Lister et al. | |
| 5,443,719 A * | 8/1995 | Johnson et al. | 210/101 |
| 5,597,479 A * | 1/1997 | Johnson | 210/192 |
| 5,622,622 A * | 4/1997 | Johnson | 210/192 |
| 5,997,812 A * | 12/1999 | Burnham et al. | 422/24 |
| 6,056,885 A | 5/2000 | Wasinger | |
| 6,966,996 B2 * | 11/2005 | Leffler | 210/748 |
| 2004/0159615 A1* | 8/2004 | Leffler | 210/748 |
| 2005/0156119 A1* | 7/2005 | Greene | 250/436 |

OTHER PUBLICATIONS

Advanced (Non-Chemical) Water Treatment Method and Apparatus Process, Employing "Ionized Air" Vapor Ion and/or Electrolysis Ion Purification Systems, to Produce A Method For Water Decontamination Known As The "Superoxide" Process, 12 pages.

* cited by examiner

*Primary Examiner*—Walter D. Griffin
*Assistant Examiner*—Cameron J Allen
(74) *Attorney, Agent, or Firm*—Gerald E. Helget; Nelson R. Capes; Briggs and Morgan, P.A.

(57) ABSTRACT

An apparatus for deodorization of livestock waste includes a tank containing livestock waste to be deodorized; a source of atmospheric air; a source of ultraviolet light; and a magnet. Air from the source of atmospheric air is passed by the source of ultraviolet light while simultaneously being exposed to magnetic flux from the magnet, thereby creating a plurality of multivalent oxygen ion allotropes. The apparatus delivers the atmospheric air containing multivalent oxygen ion allotropes to the livestock waste, thereby reducing odor. A method for deodorizing livestock waste, has the steps of: pumping waste from a holding tank; exposing atmospheric air to ultraviolet light and magnetic flux, thereby creating a plurality of multivalent oxygen ion allotropes; exposing the waste to the air containing the plurality of multivalent oxygen ion allotropes; and returning the waste to the holding tank.

18 Claims, 2 Drawing Sheets

DEODORIZATION OF LIVESTOCK WASTE USING OZONE

BACKGROUND OF THE INVENTION

This invention relates to a system of ionized oxygen allotrope gas livestock waste deodorization and method and apparatus therefore, and more particularly, a system of, and a method and apparatus therefore that generates multiple (multivalent) oxygen ion charged forms for treated livestock waste, as for deodorization purposes, in which the treating agent employed is atmospheric oxygen in the ambient air. More specifically, a basic feature of the invention is to continuously draw an ambient air flow into the system and process same, to concurrently energy transform and ionize the atmospheric oxygen therein to form stable and highly energized multivalent oxygen allotrope ions in oxidant gaseous form that are conveyed to and continuously applied to the livestock waste being treated by interspersing the air flow involved therein, for elimination by oxidation and/or flocculation of the contaminants and other undesirable materials contained in same, by the oxygen allotrope ions; with the remaining components of the air returning harmlessly to the atmosphere.

U.S. Pat. No. 4,655,933, herein incorporated by reference, discloses a livestock waste purification arrangement which uses as the water treating agent ionized oxygen allotrope gas in multiple (multivalent) ion charge forms.

Aside from water purification systems of the filtration and/or integrated ion exchange membrane process type, the vast majority of water purification technology utilized at the present time is concerned with a broad application spectrum of a wide variety of chemical additive type water treatment processes, a number of which are oxidizing or descaling agents, as distinguished from oxygen or its allotropes, and all of which are not available from the ambient air or natural locale of the water to be treated. Traditional chemical treatment of water has involved a wide variety of industrially formulated chemical substances for disinfection, descaling, detoxification, sterilization, flocculation, or anticoagulation applications or purposes. Purification chemicals commonly may take any one of the three physical states, solids, liquids or gases, and range from complex chemical formulations to highly active elemental substances, such as the halogens. These various chemical compounds or substances for water purification purposes have dramatic chemical structural differences one from another, depending on whether they are categorized, as, for instance, biocides, algacides, fungacides, scale inhibitors, descalers, de-emulsificrs, coagulants, coalescents, flocculants, de-toxicants, surfactants, disinfectants, etc. The material of each such category is also subdivided into several sub-groups with regard to individual chemical strength and reactive oxidizing potentials per solubility limits for chemical water saturation.

In any event, the basic inherent problems associated with water treatment using formulated chemicals has been historically one of "too little or too much" or synergistic interreactions that produce new chemical compounds that are corrosive or dangerous. Further, the solubility and reactivity of the chemical additive often changes with water temperature changes; reactivity may be further affected by minor water chemistry natural shifts in acidity-alkalinity values as well as by chemical additive neutralization interaction with other foreign contaminant chemical substances.

Furthermore, it is all too common place that the chemical treatment additive prescribed for a particular problem will have an adverse reaction and be incompatible with other chemical treatment additives or even some of the contaminants in the water system, resulting in no real benefit and often having some deleterious affect on water quality, as well as the possibility of adversely affecting the health of the users of the water.

It is well recognized that the treatment of water with chemicals for purification and related purposes, while widely employed for this purpose in quite a number of different applications, is well known to be an inexact science, with the chemicals themselves often being questioned as the possible source of health problems, such as the causing of cancer, and the like.

On the other hand, water treatment systems that do not involve the addition or use of chemicals as such, but rather employ gaseous ozone obtained from the ambient air, which are of the so-called non-chemical type, have experienced only modest success and acceptance. While the injection of gaseous ozone in neutral molecular form into public drinking water supplies for the purpose of disinfection and purification has been an acceptable practice in Europe since the turn of the Century, and on account of the recognized oxidizing activity of neutral ozone gas, increasing number of applications of it have been made, wider use for all applications has been prevented because of the expense of ozone production, particularly in large volumes. Conventionally large volume ozone gas production is accomplished by employing expensive high voltage electric discharge equipment, such as 10,000 volt corona discharge generators, in which atmospheric oxygen is converted into neutral ozone gas molecules within an intense electrical discharge electromagnetic arc zone. Corona generators are known to have excessive power consumption requirements; further, the maintenance requirements of this type of equipment are excessive in that constant repair service is required on the anode-cathode electrodes along with constant servicing of the dehumidifying air dryer and dessicating units. Also, large municipal and industrial ozone systems require additional costly cooling tower equipment to relieve generated heat. While small wall hung type corona discharge ozone generating devices have been available since about 1950, their known technical limitations represent real safety concerns due to the relatively high voltage requirements for the generator and the close proximity to the water that is required for the generator. Even in the smaller corona units, high maintenance requirements for the electrode and air drying modules are a continuing problem.

Nevertheless, as neutral ozone is known to be a strong and rapid oxidizing agent, its consideration for use in purification of municipal water supplies has continued. Neutral ozone, however, for rapid purification purposes, requires the delivery of large quantities of the gas for application to the water supply, which, of course, involves large capital expenditures.

While previous systems have employed ionized oxygen allotrope gas to treat water, the present invention relates to an apparatus and method to employ such gas to deodorize livestock waste.

SUMMARY OF THE INVENTION

An apparatus for deodorization of livestock waste includes a tank containing livestock waste to be deodorized; a source of atmospheric air; a source of ultraviolet light; and a magnet. Air from the source of atmospheric air is passed by the source of ultraviolet light while simultaneously being exposed to magnetic flux from the magnet, thereby creating a plurality of multivalent oxygen ion allotropes. The apparatus delivers the atmospheric air containing multivalent oxygen ion allotropes to the livestock waste, thereby reducing odor. A method for deodorizing livestock waste, has the steps of: pumping waste from a holding tank; exposing atmospheric air to ultraviolet light and magnetic flux, thereby creating a plurality of multivalent oxygen ion allotropes; exposing the waste to the air containing the plurality of multivalent oxygen ion allotropes; and returning the waste to the holding tank.

A principal object of the present invention is to provide an ambient air source oxidizing and/or flocculating agent providing a system of livestock waste deodorization and method and apparatus therefore utilizing as the treatment agent atmospheric oxygen that may be obtained from the ambient air, simply treated by inexpensive energy efficient equipment and procedures that induce an ambient air inflow into the system and transform the atmospheric oxygen of such air flow into ionized oxygen (multivalent oxygen ion) allotropes of high energy content, as distinguished from neutral ozone, and which supplies the air flow, including the ionized oxygen allotropes in oxidant multivalent oxygen ion gas form, to the livestock waste, and on a constant application basis and in the quantities needed to effect beneficial oxidant multivalent oxygen ion treatment of the livestock waste by the ionized oxygen allotropes for all purposes that can be achieved using traditional formulated chemical treatment approaches, including removal of contaminants and other foreign materials.

Another important object of the invention is to provide a simple low cost, highly efficient ionized oxygen allotrope, or oxidant multivalent oxygen ion gas generator and method of generating ionized oxygen allotrope in gaseous form, which uses ambient air as the raw material for the generator, which has no need for formulated chemicals and has dramatically low power requirements while providing the needed capacity on a continual operating basis for large scale livestock waste treatment purposes.

Still another important object of the invention is to provide a system of livestock waste treatment for deodorization and related purposes, and method and apparatus therefore, in which the real potential of modified ozone resonation(s) and other oxidizing multivalent oxygen ion allotropes for this purpose is achieved while at the same time providing livestock waste treatment alternates to traditional chemical purification systems.

Still another important object of the invention is to provide a system of livestock waste treatment for purification and method and apparatus therefore that is readily adapted for serving a wide variety of industrial and commercial livestock waste deodorization purposes, as for instance treatment of Dairy waste.

Yet further objects of the invention are to provide simplified methods and equipment for livestock waste treatment purposes whereby the multivalent oxygen ion allotrope gas acts as the sole livestock waste treating agent, and is drawn as part of an ambient air flow from the ambient atmosphere and is interspersed into the livestock waste by simplified equipment that is inexpensive to manufacture and install, easily operated by even the most inexperienced persons, and that is long lived and effective in use for a wide variety of purposes.

DETAILED DESCRIPTION OF THE PREFERRED EMBODIMENT

Figure 1:
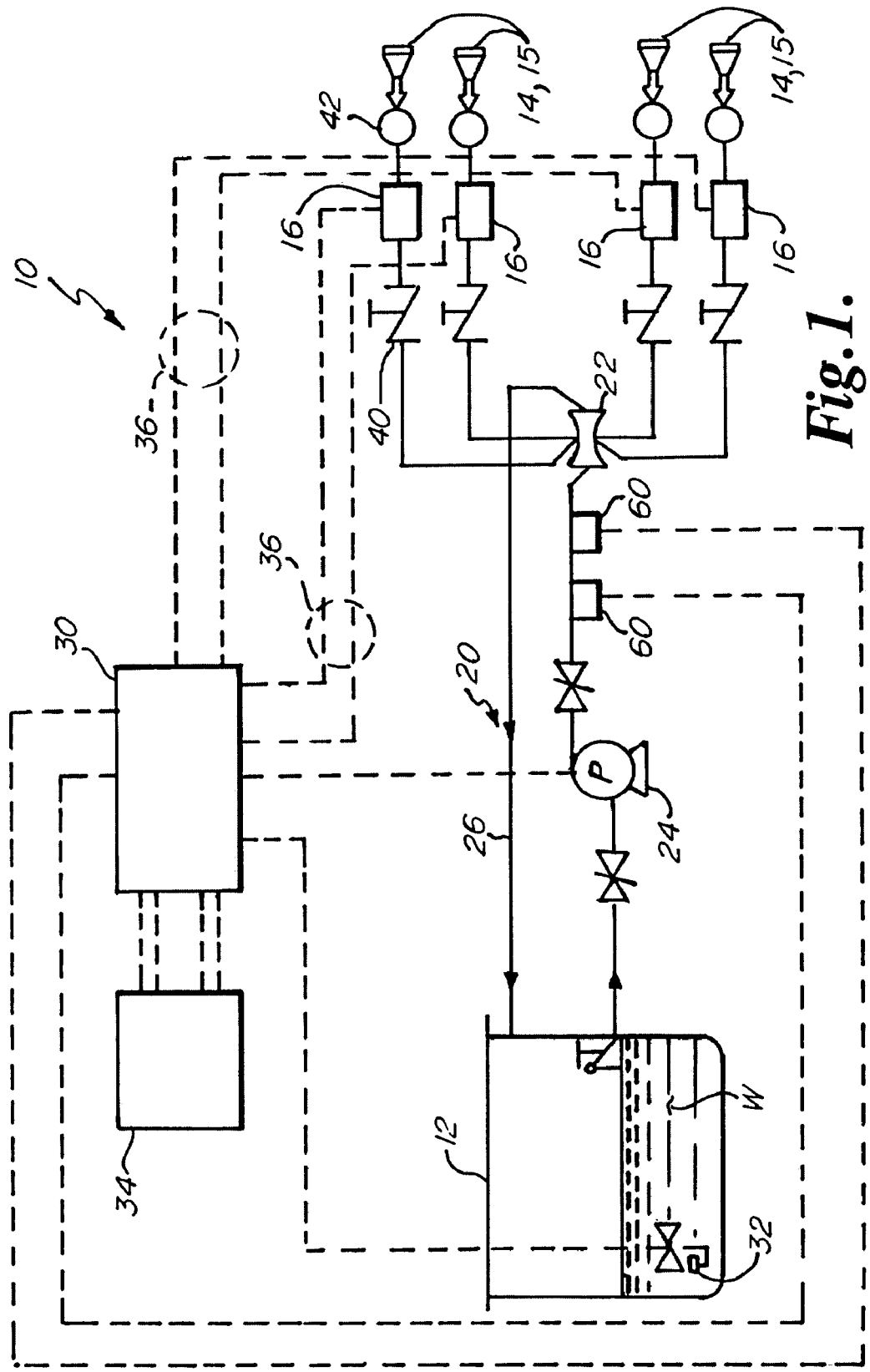
FIG. 1 is a schematic of the apparatus of the present invention.

The present invention is generally designated in the Figures as reference numeral 10.

In one aspect, the present invention is an apparatus 10 for deodorization of livestock waste, comprising a tank 12 containing livestock waste W to be deodorized; a source 14 of atmospheric air; a source 16 of ultraviolet light; and a magnet 18. Air from the source 14 is passed by the source 16 of ultraviolet light while simultaneously being exposed to magnetic flux from the magnet 18, thereby creating a plurality of multivalent oxygen ion allotropes, as previously described in U.S. Pat. No. 4,655,933. An apparatus 20 delivers the atmospheric air containing the plurality of multivalent oxygen ion allotropes to the waste W, thereby reducing odor from the waste.

In a preferred embodiment, the apparatus 20 for delivering the atmospheric air containing the plurality of multivalent oxygen ion allotropes to the waste W further comprises a venturi 22, a pump 24 removing the waste W from the tank 12 and passing the waste W through the venturi 22, thereby creating a vacuum and thus drawing the atmospheric air containing the plurality of multivalent oxygen ion allotropes into the waste W; and piping 26 to return the waste W to the tank 12.

In a preferred embodiment, the source 14 of ultraviolet light is an ultraviolet lamp 28.

In a preferred embodiment, the apparatus 10 further comprises a control system 30 responsive to a float valve 32 in the tank 12, the float valve signaling the level of waste W in the tank 12. A ballast box 34 provides electrical power to the ultraviolet lamp 28. The control system 30, responsive to the signal from the float valve 32, breaks connections 36 from the ballast box 32 to the ultraviolet lamp 28 when the level of waste W in the tank reaches a pre-determined level. The control system may also stop the pump 24 when the level of waste reaches this level.

Check valves 40 are suitably placed between the source 14 of atmospheric air and the tank 12 to prevent waste from the tank from flowing to the environment.

In a preferred embodiment, a filter 42 is placed between the source 14 of atmospheric air and the source 16 of ultraviolet light.

Figure 2:
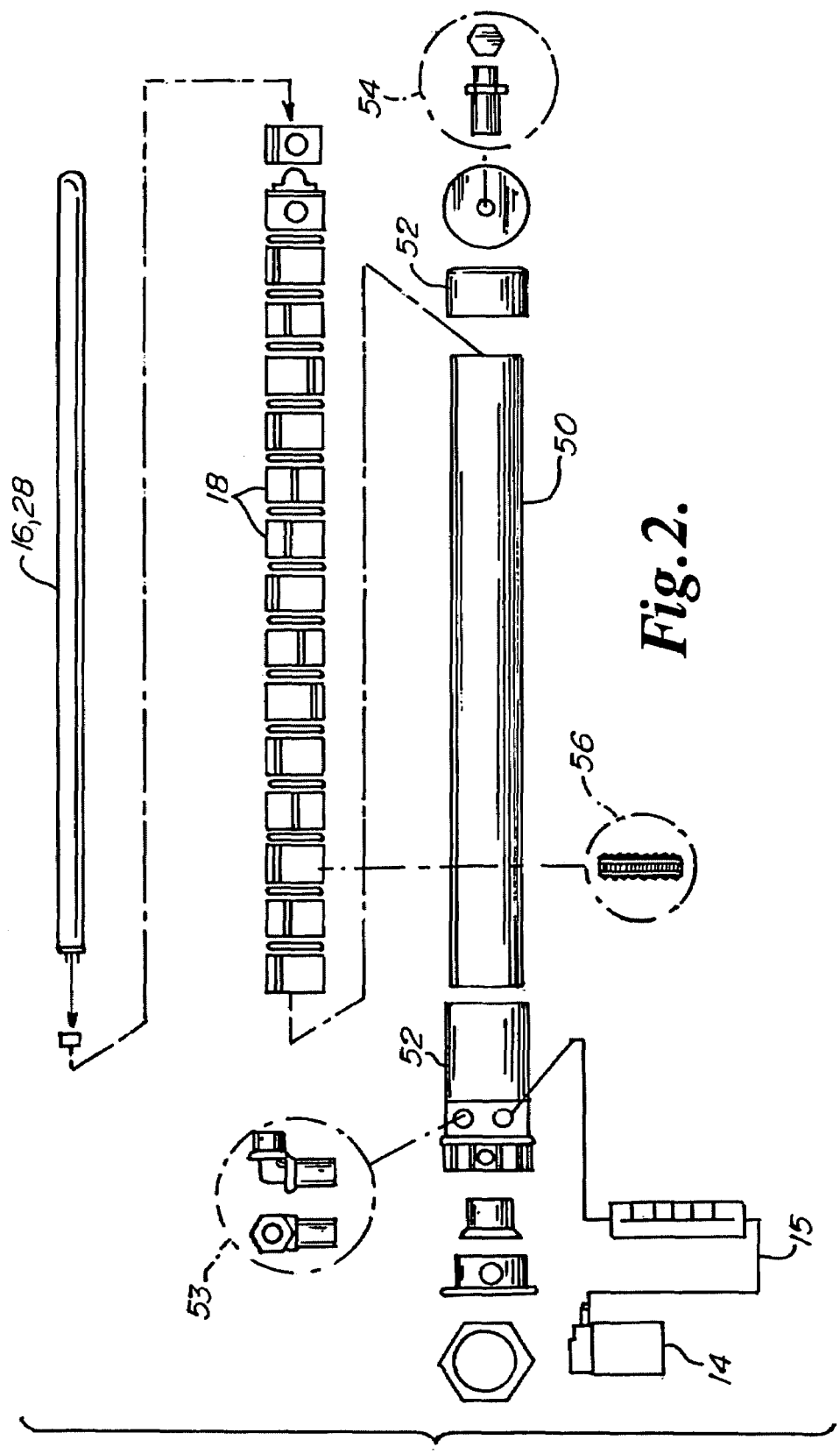
FIG. 2 is a detailed schematic of an embodiment of the ultraviolet light and magnetic flux apparatus of the present invention.

A preferred structure of the source of ultraviolet light and magnet is shown in FIG. 2. The ultraviolet lamp 28 is enclosed within a plurality of ring magnets 18, which are in turn enclosed within an ultraviolet vessel 50. The ultraviolet vessel 50 has end caps 52. One of the end caps 52 is drilled and tapped with fittings 53 to receive air from supply lines 15 (FIG. 1) from the source 14 of atmospheric air and connections 36 to the ultraviolet lamp 28. The other end cap 52 is drilled and tapped to receive a fitting 54 for connection to the venturi 22 (FIG. 1).

An optional fiber optic sight glass 56 may be inserted into the ultraviolet vessel 50 to allow an operator to determine whether the ultraviolet lamp is working.

In a preferred embodiment, at least two electrodes 60 expose the waste to direct current to remove dissolved impurities such as metal ions and carbamates. By passing the aqueous solution of waste by the electrodes 60 an electro-reaction with dissolved impurities is believed to take place. The effect is achieved by passing direct current through the electrodes. The charge attracts the various unwanted ions. By regularly switching the polarity back and forth between the two electrodes, these impurities are caused to drop off metal surfaces thus de-scaling the surfaces. Larger particles may be eliminated by additional filtering systems.

In a second aspect, the present invention is a method for deodorizing livestock waste, comprising the steps of:
 pumping waste from a holding tank;
 exposing atmospheric air to ultraviolet light and magnetic flux, thereby creating a plurality of multivalent oxygen ion allotropes;
 exposing the waste to the air containing the plurality of multivalent oxygen ion allotropes; and
 returning the waste to the holding tank.

In a preferred embodiment, the method further comprises the step of filtering the atmospheric air before exposure to ultraviolet light and magnetic flux.

In a preferred embodiment, the method further comprises the step of controlling the previous steps based on the level of waste in the holding tank.

In a preferred embodiment, the method further comprises the step of exposing the waste to the air containing the plurality multivalent oxygen ion allotropes further comprises the step of passing the waste through a venturi, thereby creating a vacuum and pulling atmospheric air into the waste by means of the vacuum.

In a preferred embodiment, the method further comprises the step of exposing the waste to direct current from at least two electrodes, wherein the polarity of the electrodes is periodically reversed, thereby removing impurities from the waste.

EXPERIMENTS

The facility used was an environmentally controlled grow-finish building constructed over a manure pit capable of holding 107,730 gallons of swine slurry, and containing 44,888 gallons of slurry at the time of the experiment. The system injected air at a rate of 6.25 cfm that was previously exposed to ultra-violet light into slurry pumped at 100 gpm, which was equivalent to exposing the entire pit contents once every 7.5 hours. Prior to treatment, the slurry was analyzed to contain 4.61% solids, 6.8 pH, 482.5 plus or minus 3.54 mg/l settleable solids (SS), 2,175 plus or minus 139 mg/l total suspended solids (TSS), 220.2 plus or minus 3.8 ppm ammonia, less than minimum detection limits (MDL) of dissolved oxygen (DO), 59,275 plus or minus 3,888 mg/l chemical oxygen demand ©D), 0.49 plus or minus 0.01% nitrogen and 1.55 plus or minus 1.15% phosphorus with a 0.31:1 N:P ratio.

Following 72 hours of treatment, solids concentrations were lowered (P<0.05) to 1.45%; SS were reduced (P<0.05) 96.4%; TSS were reduced (P<0.05) 77.9%; ammonia, DO, and COD were not significantly different; nitrogen was lowered (P<0.05) to 0.28 plus or minus 0.01%; phosphorus was below MDL; and the N:P ratio was improved (P<0.05) to 27.9:1. No significant changes between 72 hours and 96 hours of treatment in any of the characteristics measured were observed.

Four air sample bags were collected prior to treatment, and following 48 hours, 72 hours, and 96 hours of treatment with subsequent analyses by a trained human odor panel (N=8). The recognition threshold (lowest dilution concentration that odor could be recognized) prior to treatment was 1382 plus or minus 74 and significantly lower after 48 hours of treatment (205 plus or minus 69). Odor intensity was significantly higher prior to treatment than after 48 hours of treatment comparing mean intensities of 3.14 plus or minus 0.26 and 2.29 plus or minus 0.39, respectively. No changes (P>0.05 in odor intensity or threshold were detected between 48 hours and subsequent observations at 72 hours and 96 hours.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. Apparatus for deodorization of livestock waste, comprising:
 (a) a tank containing livestock waste to be deodorized;
 (b) a source of atmospheric air;
 (c) a source of ultraviolet light; and
 (d) a magnet;
 (e) wherein air from the source of atmospheric air is passed by the source of ultraviolet light while simultaneously being exposed to magnetic flux from the magnet, thereby creating a plurality of multivalent oxygen ion aflotropes; and
 (f) apparatus for delivering the atmospheric air containing multivalent oxygen ion allotropes to the livestock waste, thereby reducing odor, wherein the apparatus for delivering the atmospheric air to the livestock waste in the tank further comprises a venturi;
 (g) further comprising a pump removing waste from the tank, passing the waste through the venturi, and piping to return the waste to the tank.

2. The apparatus of claim 1, wherein the waste flowing though the venturi creates a vacuum, pulling atmospheric air past the source of ultraviolet light and the magnet.

3. The apparatus of claim 1, further comprising a control system.

4. The apparatus of claim 3, further comprising a float valve in the tank sensing the level of waste in the tank and signaling the waste level to the control system.

5. The apparatus of claim 4, wherein the control system controls the source of ultraviolet light, based on the signal from the float valve.

6. The apparatus of claim 4, wherein the source of ultraviolet light is an ultraviolet lamp, and wherein the control system makes and breaks connections between a ballast box and the ultraviolet lamp.

7. The apparatus of claim 4, further comprising a pump removing waste from the tank, passing the waste through the venturi, and piping to return the waste to the tank, wherein the control system controls the pump.

8. The apparatus of claim 1, further comprising an air filter between the source of atmospheric air and the source of ultraviolet light.

9. The apparatus of claim 1, further comprising a check valve between the source of atmospheric air and the tank.

10. The apparatus of claim 4, further comprising at least two electrodes acting upon the waste to remove dissolved impurities.

11. The apparatus of claim 10, wherein the electrodes pass direct current through the waste and wherein the polarity of the electrodes is periodically reversed.

12. The apparatus of claim 10, wherein the dissolved impurities consist essentially of metal ions and carbamates.

13. The apparatus of claim 10, further comprising the step of exposing the waste to direct current from at least two electrodes, wherein the polarity of the electrodes is periodically reversed, thereby removing impurities from the waste.

14. Apparatus for deodorization of livestock waste, comprising:
- (a) a tank containing livestock waste to be deodorized;
- (b) a source of atmospheric air;
- (c) a source of ultraviolet light; and
- (d) a magnet;
- (e) wherein air from the source of atmospheric air is passed by the source of ultraviolet light while simultaneously being exposed to magnetic flux from the magnet, thereby creating a plurality of multivalent oxygen ion allotropes; and
- (f) apparatus for delivering the atmospheric air containing multivalent oxygen ion allotropes to the livestock waste, thereby reducing odor,
- (g) futher comprising a control system.

15. The apparatus of claim 14, wherein the control system controls the source of ultraviolet light, based on the signal from the float valve.

16. The apparatus of claim 15, wherein the source of ultraviolet light is an ultraviolet lamp, and wherein the control system makes and breaks connections between a ballast box and the ultraviolet lamp.

17. Apparatus for deodorization of livestock waste, comprising:
- (a) a tank containing livestock waste to be deodorized;
- (b) a source of atmospheric air;
- (c) a source of ultraviolet light; and
- (d) a magnet;
- (e) wherein air from the source of atmospheric air is passed by the source of ultraviolet light while simultaneously being exposed to magnetic flux from the magnet, thereby creating a plurality of multivalent oxygen ion allotropes; and
- (f) apparatus for delivering the atmospheric air containing multivalent oxygen ion allotropes to the livestock waste, thereby reducing odor,
- (g) further comprising an air filter between the source of atmospheric air and the source of ultraviolet light.

18. Apparatus for deodorization of livestock waste, comprising:
- (a) a tank containing livestock waste to be deodorized;
- (b) a source of atmospheric air;
- (c) a source of ultraviolet light; and
- (d) a magnet;
- (e) wherein air from the source of atmospheric air is passed by the source of ultraviolet light while simultaneously being exposed to magnetic flux from the magnet, thereby creating a plurality of multivalent oxygen ion allotropes; and
- (f) apparatus for delivering the atmospheric air containing multivalent oxygen ion allotropes to the livestock waste, thereby reducing odor,
- (g) further comprising a check valve between the source of atmospheric air and the tank.

* * * * *